M. O. BEATTY.
COMBINED COTTON PLANTER, GUANO DISTRIBUTOR, CULTIVATOR AND ROLLER.

No. 177,369. Patented May 16, 1876.

Witnesses.

Inventor.
M. O. Beatty

UNITED STATES PATENT OFFICE.

MATTHEW O. BEATTY, OF CONCORD, NORTH CAROLINA.

IMPROVEMENT IN COMBINED COTTON-PLANTERS, GUANO-DISTRIBUTERS, CULTIVATORS, AND ROLLERS.

Specification forming part of Letters Patent No. 177,369, dated May 16, 1876; application filed May 1, 1876.

*To all whom it may concern:*

Be it known that I, MATTHEW O. BEATTY, of the town of Concord and State of North Carolina, have invented the Combined Cotton-Planter, Guano-Distributer, Chopper, Cultivator, and Roller, of which the following is a specification:

The object of my invention is to facilitate and cheapen the cultivation of cotton.

Figure 1:
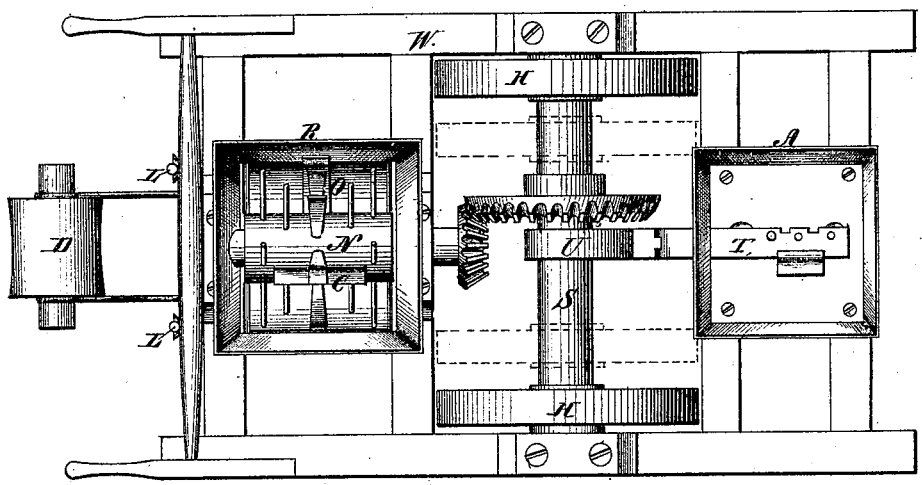
Figure 2:
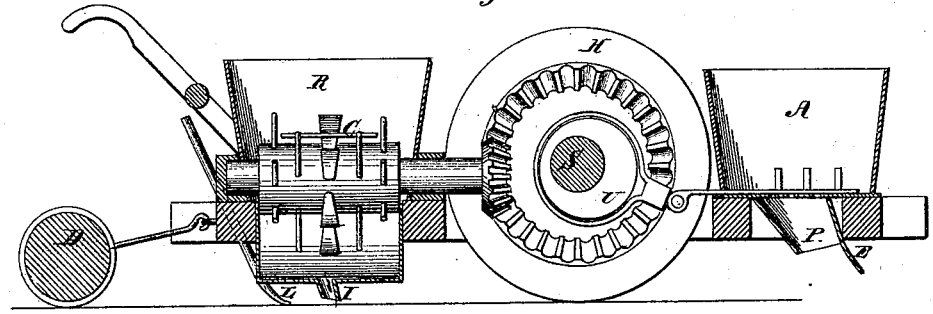
Figure 3:
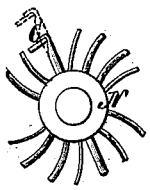

A common frame is used, as seen in Figure 1, marked W. The hopper A, Fig. 2, is the receptacle for the guano. The feeder T passes through an opening in the lower edge of the rear side near the bottom of the hopper A, Fig. 2, and is worked by the cam U, the guano falling through the spout P into the furrow made by the plow E, Fig. 2. The pins in the feeder T keep the guano in motion, the quantity being regulated by closing some of the openings in the bottom of the hopper A, Fig. 2. The cotton-seed in the hopper R, Fig. 2, is kept in motion by the curved pins in the feed-roller N, Figs. 1 and 3, and is forced through the opening in the bottom of the hopper R, Fig. 2, by means of the flat curved feeders in the roller N, Figs. 1 and 3, which is revolved by the cog-gearing on shaft S, Fig. 1, the seed falling into the spout I, Fig. 2, and into the furrow made by the plow E, Fig. 2. The quantity of seed is regulated by the slide O in hopper R, Fig. 2, and is covered by the plows L L′, Fig. 2, followed by the concave roller D, Fig. 1, hinged to the rear of the frame W, Fig. 1. The hoppers A and R and the roller D are taken off, and the chopper G, Fig. 3, put into the roller N at any angle to the cotton-row, the angle of the chopper G regulating the space to be cut out in the cotton-row, and the plows L L′, Fig. 2, dressing the cotton-plants at the same time. The plows L L′, being adjustable, both vertically and horizontally, serve the double purpose of covering the seed in planting, in gaging the depth of the cut in chopping, and in cultivating the growing plant.

I claim—

The combination and arrangement of the fertilizer-distributer A T, its opening-plow E and spout P, the adjustable bearing-wheels H H, the seed-distributing cylinder N, with its backwardly-curved arms, and an adjustable cotton-chopper blade, C, adjustable plows L L′, and roller D, as and for the purpose specified.

M. O. BEATTY.

Witnesses:
   WILLIAM L. BRAMHALL,
   WILLIAM S. CHAMBERLIN.